United States Patent
Ghosh et al.

(10) Patent No.: US 8,241,483 B2
(45) Date of Patent: Aug. 14, 2012

(54) PROCESS FOR THE PREPARATION OF STABLE IODATE-EXCHANGED SYNTHETIC HYDROTALCITE WITH ZERO EFFLUENT DISCHARGE

(75) Inventors: Pushpito Kumar Ghosh, Bhavnagar (IN); Mahesh Ramaniklal Gandhi, Bhavnagar (IN); Satish Hariray Mehta, Bhavnagar (IN); Ramachandraiah Gadde, Bhavnagar (IN); Jatin Rameshchandra Chunawala, Bhavnagar (IN); Mirnal Vinodbhai Sheth, Bhavnagar (IN); Girirajsinh Sabalsinh Gohil, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 909 days.

(21) Appl. No.: 12/239,621

(22) Filed: Sep. 26, 2008

(65) Prior Publication Data

US 2009/0188810 A1 Jul. 30, 2009

(30) Foreign Application Priority Data

Jan. 25, 2008 (IN) .............................. 207/DEL/2008

(51) Int. Cl.
*C25B 1/24* (2006.01)
*A61K 33/36* (2006.01)

(52) U.S. Cl. ......... 205/498; 205/499; 205/556; 205/688
(58) Field of Classification Search ................... 205/688, 205/742, 556, 498, 499
See application file for complete search history.

(56) References Cited

U.S. PATENT DOCUMENTS

| | | | | |
|---|---|---|---|---|
| 2,770,589 A | * | 11/1956 | Mehltretter | 205/499 |
| 2,828,184 A | * | 3/1958 | Behrman | 423/475 |
| 2006/0003024 A1 | * | 1/2006 | Ghosh et al. | 424/667 |

FOREIGN PATENT DOCUMENTS

ZA 200004598 A 3/2002

* cited by examiner

*Primary Examiner* — Arun S Phasge
(74) *Attorney, Agent, or Firm* — DLA Piper LLP (US)

(57) ABSTRACT

The present invention relates to a process for the preparation of stable iodate-exchanged hydrotalcite with zero effluent discharge. The iodate-exchanged hydrotalcite produced is useful as iodizing agent. The invention further relates to utilization of alkaline effluent generated in the process of ion exchange of iodate into SHT so as to fully recycle the residual iodate anion and also utilize the alkali generated in the process for production of additional quantities of iodate through reaction with iodine crystals followed by electrochemical oxidation to obtain pure aqueous solution of iodate salt which can be reused for preparation of the stable iodizing agent. The process gives zero effluent discharge hence economical.

9 Claims, No Drawings

PROCESS FOR THE PREPARATION OF STABLE IODATE-EXCHANGED SYNTHETIC HYDROTALCITE WITH ZERO EFFLUENT DISCHARGE

CROSS REFERENCE TO RELATED APPLICATION

This application is a utility application and claims the benefit under 35 USC §119(a) of India Application No. 207/DEL/2008 filed Jan. 25, 2008. The disclosure of the prior application is considered part of and is incorporated by reference in the disclosure of this application.

BACKGROUND OF THE INVENTION

1. Field of the Invention

The present invention relates to a process for the preparation of stable iodate-exchanged synthetic hydrotalcite with zero effluent discharge.

More particularly, the invention relates to a process for utilization of alkaline effluent generated in the said iodate exchange process to regenerate iodate salt from elemental iodine thereby making the process zero effluent discharge hence more economical.

2. Background and Prior Art of the Invention

Iodine is a very important trace element necessary in the biosynthesis of thyroid hormones. Iodine is required for developing and maintaining healthy body. There are well known Iodine Deficiency Disorders like Goiter and Cretinism. The edible salt is chosen as a vehicle in the provision of iodine because of its uniform consumption and availability to all segments of population independent of social or economic status. In order to deliver adequate amount of iodine to the consumer while avoiding the unnecessary excess addition of iodizing agent in salt that is normally done to compensate for losses, it is of paramount importance that a stable iodizing agent should be used.

The iodate-exchanged synthetic hydrotalcite is known to be useful as an iodizing agent.

Reference may be made to Patent publication No. WO/2006/067798 dated 29 Jun., 2006, Ghosh, P. K. et al. wherein the prior art on salt iodization and stability of iodine in iodized salt are cited.

Reference may be made to Republic of South Africa Patent No. 20004598, Kulkami, S. M. and Pramanik, A. wherein the preparation of stable iodized salt through intercalation of iodate anion in layered double hydroxide is being disclosed. Although excess amount of potassium iodate is taken for the above purpose no mention is made of the fate of the residual iodate-containing effluent.

Reference may be made to Indian Patent Application No. 1219/DEL/2004 dated on 30Jun. 2004 (corresponding WO2006/003669 and US20060003024), Ghosh, P. K. et al. wherein a stable form of iodizing agent prepared through ion-exchange of iodate anion in synthetic hydrotalcite clay is disclosed. The process involves calcination of SHT, treatment of the calcined SHT with potassium iodate solution, filtering of the mass to obtain SHT-iodate and liquid effluent. It is stated therein that a part of the potassium iodate remains in the effluent and, furthermore, that all of the potassium ion originally present in the potassium iodate is also present in the effluent but there is no mention of the fate of the effluent.

Reference may also be made to Patent publication No. WO/2006/067798 dated 29 Jun., 2006, Ghosh et al. wherein the preparation of 5:1 (mole ratio) of iodide salt to iodate salt is obtained by treating elemental iodine with alkali solution.

Reference may also be made to Indian Patent Application No: 0479/DEL/2003, Ghosh et al. wherein an improved process of preparation of potassium iodate from potassium iodide is disclosed.

Reference may also be made to Chinese patent No: CN 1861091, Xia, Meisheng et al. wherein the process for preparation of new hydrotalcite formulations for iodine supplement is disclosed.

In view of the above cited prior art, the inventors of this application understood the need for a process for the preparation of an oxidizing agent with zero effluent discharge which obviates the drawbacks of the prior art.

OBJECTS OF THE INVENTION

The main object of the present invention is to provide a process for the preparation of stable iodate-exchanged hydrotalcite with zero effluent discharge.

Another object of the present invention is to utilize the spent solution obtained from the process of synthetic hydrotalcite-iodate preparation from calcined synthetic hydrotalcite (SHT) and hot aqueous potassium iodate so as to make the process cost-effective while eliminating effluent discharge.

Still another object is to show that the spent solution contains KOH in stoichiometrically equivalent amount as the amount of iodate taken up by calcined SHT.

Yet another object is to utilize the KOH in the spent solution by reacting it with iodine crystals to form 5:1 mole ratio of iodide to iodate by the well known reaction of the prior art.

Still another object is to recycle potassium iodate in spent solution which remains after treatment of potassium iodate with calcined SHT.

Further another object is to then oxidize the iodide present in the solution into iodate so that the solution can be recycled.

Yet another object is to undertake oxidation of iodide in a manner so as to not introduce any other anion—as would, for example, form if iodide is oxidized with hypochlorite—which may interfere with the intercalation of iodate anion.

Still another object is to carry out such oxidation electrochemically to effect >90% conversion of iodide to iodate.

Further another object is to show that small quantities of residual iodide after electrochemical oxidation do not interfere with the iodate uptake process and remain almost intact in the solution after intercalation of iodate.

Yet another object is to use calcined SHT as not only an efficient intermediate for iodate uptake from potassium iodate solution but one that simultaneously generates KOH during uptake of iodate, and which KOH, present in the spent liquor, can then be used to obtain additional quantities of potassium iodate through treatment with iodine as described above.

Still another object is to prepare SHT-iodate cost-effectively by utilizing less expensive elemental iodine in place of potassium iodate.

Still further another object is to carry out iodine uptake by SHT in eco-friendly manner so as to avoid formation of effluent.

SUMMARY OF THE INVENTION

The present invention provides a process for the preparation of stable iodate-exchanged hydrotalcite as an iodizing agent with zero effluent discharge.

Accordingly, the present invention is to provide a process for the preparation of stable iodate-exchanged hydrotalcite with zero effluent discharge, the said process comprising the following steps:

a) grinding food compatible and carbonate-exchanged synthetic hydrotalcite to pass through 60 BSS mesh;
b) calcining the powdered hydrotalcite obtained in step (a) in the temperature range of 450 to 550° C. for a period in the range of 30 to 75 minutes;
c) cooling the fired hydrotalcite as obtained from step (b) to temperature in the range of 60 to 70° C.;
d) heating an aqueous iodate solution having concentration in the range of 0.025-0.25M to a temperature ranging between 60 to 70° C.;
e) adding the solid synthetic hydrotalcite obtained from step (c) into the warm potassium iodate solution as obtained from step (d) and maintaining the temperature in the range of 60°-70° C. for a period in the range of 3-10 min under stirring;
f) ageing the slurry as obtained from step (e) for a period between 30 to 60 minutes with intermittent stirring;
g) filtering the slurry obtained from step (f) and washing the cake with distilled water followed by drying the cake in an oven in the temperature range of 80 to 110° C. to get the desired product;
h) mixing the filtrate obtained from step (g) containing residual $KIO_3$ and generated KOH with the washing of step (g) and reacting with iodine crystals;
i) subjecting the aqueous solution obtained from step (h) to electrochemical oxidation employing a two-compartment electrochemical membrane cell, with a current density in the range of 3-50 mA/cm$^2$;
j) recycling the iodate solution obtained from step (i) into above said step (d).

In an embodiment of the present invention, the iodate salt used to initialize step (d) of the process is selected from the group consisting of sodium iodate and potassium iodate.

In another embodiment of the present invention, the concentration of the iodate solution used is preferably in the range of 0.03-0.1M.

In yet another embodiment of the present invention, the concentration of iodate salt used in step (d) is in the range of 0.025-0.25 M and more particularly in the range of 0.05-0.10 M.

In yet another embodiment of the present invention, the amount of water used for washing wet cake in step (viii) is in the range of 0.25-1.0 liter per kg of product.

In still another embodiment of the present invention, the iodine content of the product obtained in step (g) is in the range of 0.5-10% (w/v).

In still another embodiment of the present invention, the iodine crystals used in step (h) of the process is in the range of 80-100% of the stoichiometric requirement with respect to KOH in the filtrate.

In still another embodiment of the present invention, the KOH concentration in the filtrate of step (h) is the range of 0.02-0.20 M, more preferably in the range of 0.04-0.08M.

Further in another embodiment of the present invention, the electrochemical cell used in step (i) of the process consists of Teflon membrane cell comprising a thin stainless steel plate, mesh or an expanded sheet as cathode and a triple metal oxide coated titanium as anode.

In yet another embodiment of the present invention, the current density employed to oxidize the iodine ion in step (i) of the process is preferably in the range of 5-10 mA/cm$^2$.

In yet another embodiment of the present invention, residual iodide content in the solution does not interfere with the intercalation of iodate into SHT nor does it intercalate to any substantial extent.

In yet another embodiment of the present invention, the SHT-iodate obtained using $KIO_3$ prepared by the processes of steps (i) and (j) is the same as that obtained using pure $KIO_3$ compound as reported in the prior art.

BRIEF DESCRIPTION OF THE TABLE

Table 1 represents the iodine content in the samples analyzed.

DETAILED DESCRIPTION OF THE INVENTION

The present invention describes a process for the preparation of stable iodate-exchanged hydrotalcite with zero effluent discharge. The present invention further provides recycling of the filtrate obtained after iodate uptake by calcined synthetic hydrotalcite so as to eliminate effluent discharge while making the process more cost-effective. The process so improved does not utilize $KIO_3$ for preparation of iodate solution except for initializing the process; instead it utilizes elemental iodine which consumes the KOH in the spent solution and also helps to recycle residual potassium iodate in spent solution remaining after the intercalation process.

The process for preparation of iodate-exchanged hydrotalcite is described as under:

Hydrotalcite is calcined at 450 to 500° C. to drive away carbon dioxide as represented by equation (1) below.

$$[Mg_{(1-x)}Al_x(OH)_2]^{x+}CO_{3(x/2)} \rightarrow Mg_{(1-x)}Al_xO_{(1+x/2)} + x/2 CO_2 + H_2O \quad (1)$$

Calcined hydrotalcite is reacted with solution of potassium iodate for intercalation of iodate ions as shown in equation (2) below.

$$Mg_{(1-x)}Al_xO_{(1+x/2)} + xKIO_3 + (1+x/2)H_2O \rightarrow [Mg_{(1-x)}Al_x(OH)_2]^{x+}[(IO_2^-)_2]_{x/2} + xKOH \quad (2)$$

After filtering the solid, the spent solution (filtrate) obtained contains 15-30% of the original $KIO_3$ amount taken. It also contains KOH generated in equation (2). The latter is reacted with iodine crystals to give KI and $KIO_3$ as shown in equation (3) below.

$$6 KOH + 3I_2 \rightarrow 5 KI + KIO_3 + 3H_2O \quad (3)$$

KI generated in Equation (3) is oxidized electrochemically to iodine at the anode (Equation 4) while water is reduced to hydrogen gas at the cathode (Equation 5). The OH$^-$ formed in the cathode chamber moves through an ion exchange membrane into the anode compartment and the resultant KOH reacts with the liberated iodine to generate potassium iodide and potassium iodate as per Equation 3.

$$2KI \rightarrow I_2 + 2K^+ + 2e^- \quad (4)$$

$$2H_2O + 2e^- \rightarrow H_2 + 2OH^- \quad (5)$$

In this manner, the KI is electrochemically converted into $KIO_3$ without formation of any other anion unlike in the case of chemical oxidation, e.g., with NaOCl, which generates impurity anions (Equation 6) that may compete adversely with iodate intercalation.

$$2KI + 6NaOCl \rightarrow 2KIO_3 + 6NaCl \quad (6)$$

The inventive steps of the invention include:
(i) recognizing that the process of intercalation of iodate into calcined SHT involves concomitant generation of KOH and that the amount of KOH produced is proportional to the amount of iodate intercalated following the reaction of Equation 2 above;
(ii) further recognizing that all of the potassium iodate taken for intercalation does not end up in the SHT and that the uptake reduces as the pH of the solution rises;

(iii) recognizing that reaction of iodine crystals with the generated KOH can help consume the KOH and at the same time help produce potassium iodate;

(iv) recognizing further that the reaction between iodine crystals and KOH does not entirely lead to potassium iodate formation but that five parts of potassium iodide are obtained for one part of potassium iodate produced as is well known in the prior art;

(v) recognizing thereafter that the potassium iodide can be converted into potassium iodate through oxidation as is well known in the prior art;

(vi) further recognizing that if such oxidation is conducted using chemical oxidations such as sodium hypochlorate, there will be inevitable formation of by-product anions that may interfere with the uptake up iodate and will certainly make it difficult to recycle in perpetuity;

(vii) recognizing that membrane-based electrochemical oxidation can avoid this dilemma and yield pure potassium iodate solution, albeit contaminated with minor amounts of KOH and residual potassium iodide;

(viii) recognizing that the above impurities do not substantially interfere with the intercalation process of potassium iodate;

(ix) recognizing that there is a need to balance out the concentration of potassium iodate taken so as to obtain the desired degree and quality of intercalation while having sufficient concentration of KOH to generate, in turn, adequately concentrated potassium iodide from elemental iodine for efficient electrochemical oxidation.

The iodine estimation was carried out using classical method of iodometry. The iodide ion was oxidized to iodate form with bromine water and analyzed for its contents. The analysis of magnesium content was carried out using EDTA complexometric titration. Aluminum was estimated employing gravimetry method by precipitating as aluminum hydroxide and weighing the fired precipitates as $Al_2O_3$. Powder XRD pattern was taken in the range of $2\theta=5\text{-}70°$. IR spectra were taken using KBr pellets in the frequency range of 4000-400 $cm^{-1}$. Potassium ions were estimated using flame photometric technique.

For electrochemical oxidation of iodide to iodate a two-compartment electrochemical anion-exchange membrane cell is used. The reaction was conducted using a rectangular (18 cm×15 cm×5.5 cm) Teflon membrane cell consisting of a thin stainless steel plate, mesh or an expanded sheet as cathode and a special triple metal oxide coated titanium as anode having an effective surface area of 56 $cm^2$. The electrodes are separated by placing a conventional anion ($OH^-$)-exchange membrane at a distance of 2 to 6 mm from each electrode in the cell to keep the electrode chambers separate and to keep the products produced at the electrodes separated. The process involves the passage of iodide containing solutions through the anode compartment while a solution of 0.8 M potassium hydroxide flows through the cathode compartment, both at 2 to 15 ml/min under gravity. A constant current at 0.5 A was applied across the two working electrodes. In all cases, the cell potential across the two current carrying electrodes was measured at 4 V. Electrolysis is terminated once the iodide oxidation is completed to the extent of >90%.

The following examples are given as way of illustration of the present invention and should not be construed to limit the scope of present invention.

EXAMPLE 1

92 gm of hydrotalcite having molar ratio of MgO: $Al_2O_3$ equal to 6.0, XRD pattern having intensity peaks (A°) 7.77, 3.87, 2.57, 1.53, 1.50, 1.42, and sharp IR absorption peak of interlayer carbonate ions at 1370 $cm^{-1}$, was powdered to pass through 60 BSS mesh and calcined in a furnace at 500° C. for 75 mins. The calcined hydrotalcite was cooled to 65° C. This was added to 500 ml of a solution containing 8.45 g (0.04 moles) of potassium iodate solution prepared in distilled water which is heated to 70° C. prior to addition. The reacting mass was stirred for five minutes maintaining the said temperature and left to stand for one hour with intermittent stirring for one minute at an interval of 30 minute. The resultant slurry was filtered. The solid separated was washed with distilled water till the wash filtrate does not show any silver iodate precipitate with silver nitrate. The solids were dried at 110° C. The dry material was analyzed for its iodine content using classical method of iodometry employing sodium thiosulphate as titrant and found to contain 4.97% of iodine in it. The filtrate measuring 520 ml was analyzed for its potassium iodate and alkali content and to contain 0.73 gm of potassium iodate and 0.074N KOH.

EXAMPLE 2

500 ml of the filtrate of Example-1, containing 0.702 g $KIO_3$ and 0.037 mol of KOH was taken in a conical flask and 4.2 gm of elemental iodine (90% of requirement for reaction with KOH) was added to it and the contents were stirred at 35° C. till all of the iodine was consumed by KOH present as per the reaction of equation 3. The resultant solution contained 1.88 g of $KIO_3$, 4.57 g of KI and 0.007 N of residual KOH. The iodide ion in the solution was electrochemically oxidized by recirculation in the anodic compartment of a two-compartment anion exchange membrane cell under constant current density of 8.92 $mA/cm^2$ and cell potential of 4.0 volts. 0.8 N KOH was used as catholyte and recovered unchanged. After an electrolysis period of 9 hours, the electrolyzed solution was analyzed and found to contain 7 gm of $KIO_3$ and 0.58 g of KI, i.e., there was 87.3% conversion of KI into $KIO_3$. The residual KOH concentration was 0.0068N.

EXAMPLE 3

The electrolyzed solution of Example 2 was taken in a beaker and the experiment of Example 1 was repeated. The dried SHT-iodate was analyzed for its iodate content and found to contain 4.4% (w/w) of iodine (as iodate) whereas $K^+$ content estimated using ICP-OES was nil. The composite filtrate (filtrate was washing) was analyzed and found to contain 0.72 gm of $KIO_3$ and 0.60 g of KI. The alkalinity of the filtrate was 0.074 N. It would be apparent that only iodate is taken up by SHT and not iodide. This example teaches us that the filtrate obtained after reaction of iodate-containing solution with SHT can be recycled with no deleterious effect. The example also teaches us that residual iodide remaining in solution after electrolysis poses no difficulty and is recovered unchanged.

EXAMPLE 4

1.0 gm of the iodine containing compound as prepared in Example-3 containing 4.4% iodine was boiled in 100 ml of distilled water for 30 mins. The slurry was filtered and the solids were washed till 100 ml of filtrate was obtained. The filtrate was analyzed for iodate content and found to contain 1.01 mg of iodine in it. The solid residue was also analyzed and found to contain 4.3% iodine. The loss of iodine from the compound in boiling water was only 2.3%.

EXAMPLE 5

800 mg of iodine containing compound prepared in Example-3 is mixed with 100 gm of solar salt containing 98.5% NaCl and 0.06% $Mg^{++}$. This premix is added in 900 gm of salt containing 0.06% $Mg^{++}$ thoroughly by sequential addition to obtain uniform mixing. Four salt samples from this mixture, each of 25 gm of salt, were analyzed for iodine content using classical method of iodometry employing sodium thiosulphate as titrant and found to contain iodine as under ascertaining uniform mixing (Table 1).

TABLE 1

| Sample no. | Iodine content in ppm |
| --- | --- |
| 1. | 35.31 |
| 2. | 34.9 |
| 3. | 35.7 |
| 4. | 35.7 |

EXAMPLE 6

One of the commercially available salt was tested for its iodine content and found to contain 37.3 ppm of iodine. A sample from this salt was moistened with 2% water and placed in an oven at 100° C. for 24 hours. Similarly, an iodized salt sample prepared using compound prepared as per Example-3 containing 35 ppm of iodine was moistened with 2% moisture and placed in an oven at 100° C. for 24 hours. The branded salt and the iodized salt prepared using the compound of present invention were analyzed for its iodine content and found to have lost 32% iodine and 1.9% iodine respectively.

ADVANTAGES OF THE INVENTION

The advantages of the present invention are:
i. The invention provides a stable iodizing compound for imparting enhanced stability of iodine in iodized salt.
ii. The iodine stability in iodizing agent is also enhanced in presence of moisture, chemical impurities, and under varying temperature conditions.
iii. The iodizing agent is prepared using food compatible synthetic hydrotalcite.
iv. The iodizing agent having enhanced stability of iodine can be prepared employing simple unit operations in cost effective manner.
v. The iodizing agent is easily and uniformly mixed in a dry state with the edible salt
vi. The costly metal iodate salt is used only for triggering the process and subsequently cheaper source of iodine crystals are used in the process making the process cost effective
vii. The process is environmentally benign and producing zero effluent

What is claimed is:

1. A process for the preparation of stable iodate-exchanged hydrotalcite with zero effluent discharge, the process comprising the following steps:
   a) calcining powdered carbonate-exchanged synthetic hydrotalcite at 450 to 550° C. and treating the calcined hydrotalcite with a known amount of aqueous alkali metal iodate salt solution to obtain a slurry having 80-85% of the iodate intercalate into the synthetic hydrotalcite while generating a stoichiometric equivalent of hydroxide ion which remains present in the solution along with unreacted iodate ion;
   b) filtering the slurry as obtained in step (a) to obtain iodate-exchanged synthetic hydrotalcite as a filter cake and filtrate containing alkali metal iodate and alkali metal hydroxide;
   c) washing the filter cake obtained in step (b) with distilled water and mixing the washing with the filtrate obtained in step (b);
   d) making use of the filtrate in the solution of step (b) through a reaction with iodine crystals to obtain an aqueous solution of iodide and iodate salts;
   e) subjecting the aqueous solution in step (d) to electrochemical oxidation in a two-compartment electrochemical membrane cell to convert alkali metal iodide into alkali metal iodate; and
   f) recycling the solution obtained in step (e) in step (a), thus resulting in zero effluent discharge.

2. The process according to claim 1, wherein the iodate salt used to initialize step (a) is selected from the group consisting of sodium iodate and potassium iodate.

3. The process according to claim 1, wherein the concentration of iodate salt used in step (a) is in the range of 0.025-0.25M.

4. The process according to claim 1, wherein the amount of water used for washing the filter cake in step (c) is in the range of 0.25-1.0 liter per kg of the filter cake.

5. The process according to claim 1, wherein the iodine content of the filter cake obtained in step (c) is in the range of 0.5-10% (w/w) after drying.

6. The process according to claim 1, wherein the alkali concentration in the filtrate of step (c) is in the range of 0.02-0.20 M.

7. The process according to claim 1, wherein the iodine crystals used in step (d) is in the range of 80-100% of the stoichiometric requirement with respect to alkali in the filtrate.

8. The process according to claim 1, wherein the electrochemical membrane cell used in step (e) comprises a Teflon membrane cell comprising a stainless steel plate, mesh or an expanded sheet electrode as a cathode, and a triple metal oxide coated titanium electrode as an anode.

9. The process according to claim 1, wherein the current density employed in step (e) is in the range of 5-10 $mA/cm^2$.

* * * * *